United States Patent
Belthle

[11] 3,888,051
[45] June 10, 1975

[54] CONTROL OF THE MOTION OF A WORK TOOL CARRIAGE

[75] Inventor: Heinz Belthle, Aichelberg, Germany

[73] Assignee: Fortuna Werke Maschinenfabrik AG, Stuttgart, Germany

[22] Filed: Dec. 20, 1973

[21] Appl. No.: 426,938

[30] Foreign Application Priority Data
Dec. 27, 1972 Germany............................ 2263452

[52] U.S. Cl................................ 51/165.77; 51/165.8
[51] Int. Cl............................................. B24b 49/04
[58] Field of Search......... 51/165 R, 165.71, 165.77, 51/165.8, 165.81

[56] References Cited
UNITED STATES PATENTS

| | | | |
|---|---|---|---|
| 3,085,371 | 4/1963 | Lessman | 51/165.8 |
| 3,193,976 | 7/1965 | Luebkemann | 51/165 R |
| 3,599,376 | 8/1971 | Renner | 51/165.8 |
| 3,691,357 | 9/1972 | McIntosh | 51/165.71 X |
| 3,698,138 | 10/1972 | Wade | 51/165.8 |
| 3,777,441 | 12/1973 | Kurimoto | 51/165.77 |

Primary Examiner—Harold D. Whitehead
Attorney, Agent, or Firm—Michael S. Striker

[57] ABSTRACT

A work tool carriage is mounted for movement along a predetermined path towards and away from a workpiece. A moving arrangement is provided for moving the work tool carriage along said path. The moving arrangement includes a rotatable member operative for causing the moving arrangement to move the carriage along said path a distance proportional to the number of rotations performed by the rotatable member. A selecting device is provided for selecting a distance to be travelled by the carriage along said path. A device is provided for determining the number of rotations performed by the rotatable member. A control arrangement is provided for initiating rotation of the rotatable member and for automatically terminating rotation of the rotatable member when the rotatable member has performed a number of rotations causing the carriage to travel the selected distance.

15 Claims, 1 Drawing Figure

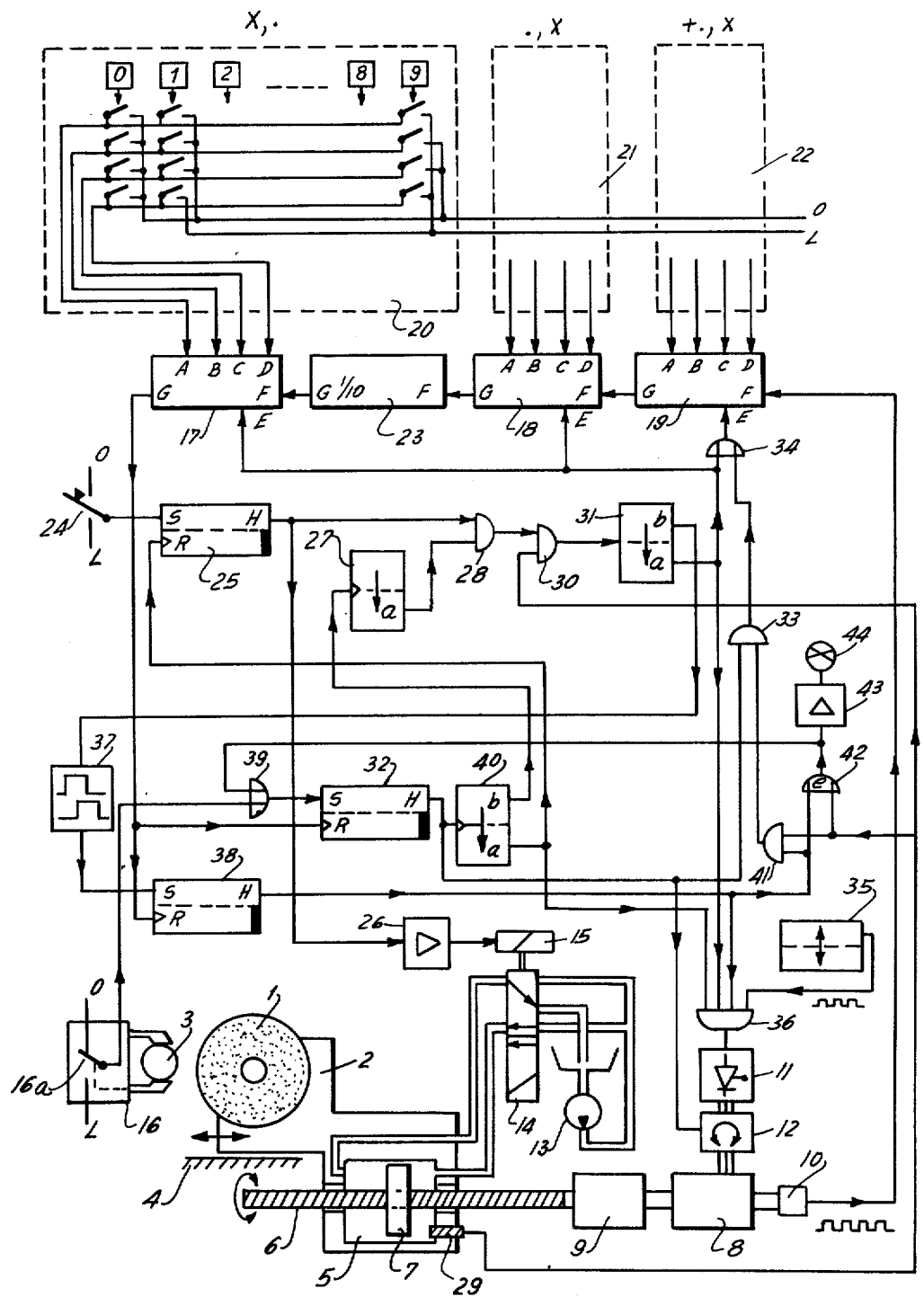

CONTROL OF THE MOTION OF A WORK TOOL CARRIAGE

BACKGROUND OF THE INVENTION

The invention relates to the control of the movement of a work tool carriage in a machine tool, for example to the control of the movement of a grinding wheel carriage in a grinding machine. It is known to advance a grinding wheel, for example, towards a workpiece at high speed, in a so-called quick-traverse advancement movement, and then to advance the grinding wheel further at a slower speed, in a so-called slow-traverse infeed movement during which the grinding wheel grinds the workpiece. Various approaches are known in the art for controlling the extent to which the grinding wheel advances during the slow-traverse infeed movement. However, all of the known approaches are characterized to a greater or lesser degree by lack of precision and lack of repeatability. Also, in the prior art, changes in the distance to be travelled by the work tool carriage during the slow-traverse infeed movement thereof, as a result of change of workpiece and/or change of work being done and/or change of work tool and/or change of work tool dimension (e.g., dressing of a grinding wheel), were relatively difficult to effect.

SUMMARY OF THE INVENTION

It is accordingly the general object of the invention to provide an arrangement for the control of the movement of a work tool carriage which overcomes the disadvantages of prior-art approaches.

It is a more particular object to provide such an arrangement wherein the control of the work tool carriage advancement and retraction is extremely precise, and precisely repeatable.

It is another object to provide an arrangement wherein the control of the work tool carriage advancement and retraction can be changed easily to take into account different workpieces and/or different types of working and/or different work tools and/or different dimensions of a particular work tool (e.g., a change of grinding wheel radius).

These objects, and other which will become understandable from the following description of an exemplary embodiment, can be met according to one advantageous concept of the invention by providing, in a machine tool, in combination, a work tool carriage mounted for movement along a predetermined path towards and away from a workpiece, moving means for moving the carriage along said path and including rotatable means operative for causing the moving means to move the carriage along said path a distance proportional to the number of rotations performed by the rotatable means, selecting means for selecting a distance to be travelled by the carriage along said path, means for determining the number of rotations performed by the rotatable means, and control means for initiating rotation of the rotatable means and operative for automatically terminating rotation of the rotatable means when the rotatable means has performed a number of rotations causing the carriage to travel the selected distance.

According to a further advantageous concept of the invention, the rotatable means comprises a rotatable threaded spindle and means coupling the threaded spindle to the work tool carriage, means for generating pulses having a frequency proportional to the rotational frequency of the threaded spindle, and means for counting the generated pulses in order to determine the number of rotations of the threaded spindle and thereby the distance advanced along said path by the work tool carriage.

The advantageousness of the invention is particularly evident when applied, for example, to the control of the movement of grinding wheel carriages in grinding machines. Initially, the grinding wheel is made to perform a quick-traverse advancement towards the workpiece, stopping just short of the workpiece, followed by a slow-traverse infeed movement also in direction towards the workpiece. The slow infeed movement proceeds at a very slow speed, relative to the quick-traverse advancement, and in order to minimize the amount of "air" through which the grinding wheel cuts, the grinding wheel should be brought as near as possible to the workpiece prior to commencement of the slow infeed movement. On the other hand, every precaution must be taken to assure that during the quick-traverse advancement the grinding wheel does not ram the workpiece, since this could result in very serious damage to the grinding machine. Inasmuch as the quick-traverse advancement movement is usually not variable or adjustable, the slow-traverse advancement (and retraction) of the grinding wheel carriage must be controlled in a very precise and reliable manner.

This is where the present invention can be of particular advantage. With the present invention, it is possible to retract the grinding wheel from the just-ground workpiece by exactly the amount of the desired depth of cut plus a small safety factor, the retraction distance being for example preselectable by means of counter circuitry. The use of pulse-generating means mechanically coupled to the rotatable means, e.g., to the rotatable threaded spindle, perhaps through the intermediary of a speed-reduction transmission, is particularly advantageous in this connection, in that it permits a direct detection of the rotation of the rotatable means, with the number of pulses generated being directly indicative of the actual advancement or retraction of the work tool carriage, irrespective of possible malfunction or irregularities in the operation of the drive means or of the transmission means connecting the drive means to the rotatable threaded spindle, for example.

According to one advantageous concept of the invention, use is made of a backwards-counting counter which starts at a preselected count corresponding to the desired rotation of the rotatable means and thus corresponding to a desired advancement or retraction distance for the carriage, and which counts backwards down to zero, the rotation of the rotatable means terminating when the counter reaches count zero.

According to this concept, a control circuit is provided. Initially, the backwards-counting counter is set to a first preselected count. The drive means which rotates the rotatable member (e.g., threaded spindle arrangement) is activated, and as the rotatable member rotates, the generated pulses are applied to the clock input of the counter which accordingly counts towards zero. As a result of rotation of the rotatable means in this first direction, the work tool carriage advances towards the workpiece. When count zero has been reached, the advancement of the workpiece is terminated. However, then the counter is reset to the preselected number, the direction of rotation of the rotatable means is reversed, and the work tool carriage performs a retracting movement, the counter meanwhile counting again down to zero, and the retraction terminating when count zero is reached.

According to a further advantageous concept of the invention, measuring means is provided for measuring the worked-upon dimension of the workpiece, e.g., for measuring the radius of a workpiece whose radius is being decreased by a grinding wheel. When the workpiece reaches the desired size, the measuring means generates a signal indicating this. Such signal effects termination of work tool carriage advancement, irrespective of the fact that the backwards-counting counter has not yet reached count zero, and furthermore effects resetting of the backwards-counting counter to a second different preselected value together with initiation of a reverse operation of the drive means such as to effect carriage retraction by a distance corresponding to such second preselected value.

The aforementioned second preselected value can correspond to the desired depth of cut plus a small additional safety margin. Thus, with the grinding wheel starting from the position in which it has just reduced the worked-upon dimension of the workpiece to the desired value, the grinding wheel can be retracted by exactly the correct amount, because changes of the grinding wheel diameter, for example as a result of dressing or trimming of the grinding wheel, can be compensated, since with the reaching of the desired value for the worked-upon dimension of the workpiece the reference position for the control of the slow infeed and outfeed movement of the carriage is always set anew.

With this approach, the first preselected count set on the backwards-counting counter at the start of the slow infeed carriage advancement, must be higher than the second preselected count, which latter corresponds to the desired depth of cut plus an additional small safety amount. Preferably, the first preselected count should be greater than the second preselected count by at least the amount of the reduction in the grinding wheel radius. This avoids the possibility of the backwards-counting counter reaching count zero and stopping slow infeed carriage advancement before the worked-upon dimension of the workpiece can be reduced to the desired extent; this could occur, for example, with a workpiece being worked upon immediately following dressing of the grinding wheel.

If the possibility of establishing two such preselected counts involves higher initial cost of the control arrangement, it should be noted that this expedient brings with it an important additional advantage justifying the cost. In the event that the measuring arrangement which determines when the worked-upon dimension of the workpiece has been reduced to the desired extent fails, then the backwards-counting counter assures that the grinding wheel will not endlessly grind away the workpiece. Accordingly, with the work tool carriage slow infeed expedient according to the invention, it is possible to work upon the workpiece in an automatic manner with a high degree of safety.

Especially when the inventive arrangement is employed in grinding operations, it is advantageous to establish a delay between the termination of the slow infeed work tool carriage advancement and the initiation of the slow outfeed work tool carriage retraction. In the case of grinding operations, this allows the work tool to remain in contact with the workpiece without further advancement for a time sufficient to ensure complete sparking out, i.e., complete finishing of the workpiece.

As an alternative to the first-mentioned form of the invention, a second form is also contemplated which makes use of a forwards-counting counter, instead of a backwards-counting counter. In the second form of the invention, the forwards-counting counter counts from zero to a first preselected value corresponding to the desired amount of slow infeed advancement of the work tool carriage, and may subsequently be reset to zero and made to count to a second preselected value corresponding to the desired amount of slow infeed retraction of the work tool carriage.

According to another advantageous concept of the invention, pulse generating means is provided for generating a pulse each time the rotatable member (e.g., threaded spindle) turns through a predetermined angle, the intervals between successive pulses (expressed in degrees of rotation of the rotatable member) corresponding to an integral multiple or an integral fraction of that component of the movement of the work tool carriage which is normal to the rotational axis of the workpiece.

This is of importance in machine tools of the type wherein the work tool carriage is oriented skew to the rotational axis of the workpiece. The advantage resides in that the counter which counts the pulses generated upon rotation of the threaded spindle, for example, can be made to assume a direct correspondence to the number of distance units travelled by the work tool carriage in the diametral direction of the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates one exemplary embodiment of the present invention.

DESCRIPTION OF THE PREFERRED EMBODIMENTS

The FIGURE schematically depicts a grinding wheel 1, mounted on a grinder carriage 2 which in turn slides along a guide track 4. For the quick-traverse moving means there is provided a double-acting hydraulic cylinder arrangement 5 rigidly connected with the carriage 2. The hydraulic cylinder arrangement 5 encompasses part of a threaded spindle 6 and also a spindle nut 7 threaded thereon. The combination of the threaded spindle 6 and the spindle nut 7 acts like a hydraulic piston in the hydraulic cylinder arrangement 5.

The drive arrangement for the threaded spindle 6 includes an electromotor 8 and an intermediate speed-reduction transmission 9. A per se known pulse generator 10 is mounted directly on one end of the output shaft of motor 8. The pulse generator may have the form of a perforated disk cooperating with a stationary photoelectric detector and mechanically coupled to the rotating spindle 7 or to the drive motor 8 therefor. An externally controlled thyristor current rectifier 11 energizes the electromotor 8 via a direction-reversing circuit 12. A hydraulic pump 13 pumps hydraulic oil through the two-position valve 14, the positions of which are determined by the state of energization of the respective control magnet 15. The illustrated position of the two-position valve 14 is maintained when the control electromagnet 15 is unenergized, and effects the quick-traverse withdrawing or backwards movement of the carriage 2. A measuring arrangement 16 senses the worked-upon dimension of the workpiece 3 (for example, the radius of a cylindrical workpiece) and when the dimension of the workpiece being altered by the grinding wheel 1 reaches a preselected value, the measuring arrangement 16 causes activation of the switch 16a. This measuring arrangement 16 is depicted only schematically, because it is known from the prior art, for example from German Pat. No. 877,500.

The counter of the illustrated arrangement consists of three binary-decimal counting stages 17, 18 and 19, for example of the type FLJ 241 manufactured by the Siemens Corporation of Western Germany. Each of the three counting stages 17, 18, 19 can be set to a particular number, by pressing the corresponding key in a respective one of the three schematically depicted keyboards 20, 21, 22. When a particular one of the ten keys of any of the keyboards 20, 21, 22 is depressed, logical "0" and "1" signals appear in appropriate encoded form at the information inputs A, B, C, D of the respective ones of the counting stages 17, 18, 19. For example, the number one may be applied to the four inputs A, B, C, D of a particular counter in the form of the logical signals 0001. The counting stages 17, 18, 19 are so designed that the digit-representing voltages applied to the information input A, B, C, D are passed into the actual counting circuitry as soon as a logical 0 signal is applied to the set input E. The application to the set input E of a logical 0 signal causes the respective counting stage to be set to the respective encoded number applied to the four information inputs A, B, C, and D thereof.

The pulse generator 10 is connected directly to the clock input F of the counting stage 19. Only once the counter 19 has counted down to zero will the subsequent clock pulses appear at the clock output G of the counting stage 19 and become applied to the clock input F of the next counting stage 18. For example, if the counting stage 18 is set to the number five, then only the sixth and following clock pulses applied to the clock input F thereof will appear at the clock output G thereof. Connected between the clock output G of counting stage 18 and the clock input F of counting stage 17 is a divider stage 23. This divider stage 23 transmits only every tenth clock pulse received at the clock input F thereof. For example, divider stage 23 may consist of a ten-stage ring counter having an input constituting the clock input F and having ten stages the output of one of which constitutes the clock output G. The inclusion of this divider stage 23 multiplies by ten the setting of the keyboard 20. For the divider stage 23 use can for example be made of the integrated semiconductor circuit FLJ 171 manufactured by the Siemens Corporation of Western Germany.

In dependence upon the thread pitch of the threaded spindle 6, and in dependence upon the transmission ratio of transmission 9, and in dependence upon the construction of the pulse generator 10, the time interval between two successive pulses generated by pulse generator 10 will exhibit a direct proportional correspondence to the length of the fine-adjustment movement performed by the carriage 2. By suitably choosing the aforementioned components, the numerical values to which the counters 17, 18, 19 are set can advantageously be made to correspond directly to suitable units of measurement, such as millimeters or inches. If non-decadic units of measurement are employed, then the divider stage 23 must be set to another divisor factor, for example 1/12.

The keyboards 20 and 21 are used to set the counters 17 and 18 to a two-place number corresponding to the so-called grinding allowance. Starting with an unground workpiece, the workpiece radius during the grinding operation will be decreased to a final value. This decrease in the workpiece radius is referred to herein as the grinding length or depth of cut. This depth of cut plus an additional small margin of error equals the aforementioned grinding allowance. If the grinding disk, after reducing the worked-upon dimension of the workpiece to the desired value, is thereupon drawn back by an amount equal to the grinding allowance by rotation of the threaded spindle 6, then the grinding disk, after the next workpiece has been mounted in position for being ground, can be made to advance to a position just short of the surface of such next workpiece.

However, in the event that before the next operating cycle is initiated the grinding disk is trued or dressed, the distance advanced by the carriage 2 during the fine-adjustment movement thereof must be lengthened, for the next operating cycle, by a distance corresponding to the reduction in radius of the grinding wheel. In order to assure that the fine-adjustment advancement of the grinding wheel and the penetration thereof into the workpiece do not end before the worked-upon dimension of the workpiece has been decreased by the desired preselected value, it is necessary that the number for which the counter arrangement is set be increased by at least the amount of the trimming, i.e., by at least the amount of the reduction in radius of the grinding wheel. To this end, one of the ten keys on keyboard 22 will be pressed, to set that counter for a number corresponding to the grinder wheel radius reduction. For example, if the grinding wheel has been reduced in radius by 0.1 millimeter, and if the desired depth of cut is 0.8 millimeters, the "1" key of keyboard 22 and the "8" key of keyboard 21 will be depressed. In this sense the additional counting stage 19 is provided only for purposes of compensation. With the control circuitry to be described below, the counting stage 19 is operative for effecting such compensation only during the first half of the first operating cycle following the wheel dressing.

Before the operation of the control circuit depicted in the FIGURE is described in greater detail, the components of the control circuit will be briefly described.

Firstly, three bistable multivibrators (flip-flops) 25, 32 and 38 are provided. These three flip-flops assume a predetermined output state once the operating voltage of the circuitry is switched on, namely a logical 0 signal at the H outputs thereof. When a logical 1 signal is applied to the set input S of one of these flip-flops 25, 32 38, the output signal at the H output thereof changes from logical 0 to logical 1. These flip-flops can be reset (i.e., so that the signal at the H output is again a logical 0) by applying a dynamic triggering signal to the reset input R thereof. The only such signal which will reset these flip-flops is the transition from a logical 0 signal to a logical 1 signal; a transition from a logical 1 signal to a logical 0 signal, and likewise the continued existence of a logical 1 signal on the reset input R will have no effect upon the flip-flop.

The control circuit furthermore includes three monostable multivibrators 27, 31 and 40 which are employed as time-delay elements. The signals at the outputs $a$ and $b$ of these monostable multivibrators are complementary to each other. The arrow in the box representing each of the multivibrators 27, 31, 40 indicates the stable state to which the monostrable multivibrator reverts a predetermined time after being triggered to the unstable state thereof. When these monostable multivibrators 27, 31, 40 are in the stable state thereof, a logical 1 signal is present at the output $a$ thereof. These monostable multivibrators 27, 31, 40 are triggerable only upon receipt of a dynamic triggering signal, specifically a transition from a logical 0 signal to a logical 1 signal.

A per se known Schmitt trigger 37 serves as a pulse-delay stage, and a continuously oscillating oscillator 35 supplies motor-energizing pulses to the thyristor current rectifier 11. The Schmitt trigger 37 could be replaced by another functionally equivalent delay stage.

The control circuit furthermore includes AND-gates, for example those designated with the reference numerals 28, 30, 36 and 41. A logical "1" signal appears at the output of such an AND-gate only if logical "1" signals are applied to all of the inputs thereof. In contrast, with the OR-gates 34 and 39, a logical 1 signal appears at the output of the OR-gate if a logical 1 signal is applied to one or both of the input thereof.

Reference numeral 42 designates an exclusive OR-gate (for example the circuit FLH 341 manufactured by the Siemens Corporation of Western Germany). A logical 1 signal appears at the output of the exclusive OR-gate 42 only if a logical 1 signal is applied to a single one of the inputs thereof. If logical 1 signals are applied to both the inputs thereof, the signal at the output of the exclusive OR-gate 42 is a logical 0 signal. Similarly, if logical 0 signals are applied to both intputs of the exclusive OR-gate 42, then the signal at the output thereof will be a logical 0 signal.

In the FIGURE arrows are provided on the various connecting lines, to indicate the direction of signal flow.

The operation of the illustrated control arrangement is as follows:

In the starting position the carriage 2 is in its most retracted position. The counting stages 17, 18, 19 are at count zero. The flip-flops 25, 32, 38 have logical 0 signals at the H outputs thereof. The monostable multivibrators 27, 31 and 40 are in their stable states.

To initiate operation of the illustrated arrangement, the button 24 is briefly pressed, resulting in triggering of flip-flop 25 to its second stable state, wherein a logical 1 signal is present at the H output thereof. This 1 signal is applied via an amplifying stage 26 to the control magnet 15, which causes a change of position of the two-position valve 14, to the position starting the forward quick-traverse movement. The logical 1 signal appearing at the H output of flip-flop 25 is applied to one input of the AND-gate 28. The second input of AND-gate 28 also receives a logical 1 signal, from the output of monostable multivibrator 27. As soon as the carriage 2 reaches the most forwardly advanced quick-traverse position, the piston 7 activates limit switch 29, and the limit switch 29 applies a logical 1 signal to one input of the AND-gate 30. This input signal, in conjunction with the input signal applied from the output of AND-gate 28, causes the appearance of a logical 1 signal at the output of AND-gate 30. This transition from 0 to 1 triggers the monostable multivibrator 31, and the output signal an output $a$ thereof changes from logical 1 to logical 0. This 0 signal is applied directly to the set input E of the counting stages 17 and 18, which as a result now accept the numbers applied to the respective information inputs A, B, C, D thereof, and assume respective counts equal to such numbers. A logical 0 signal is present at the H output of the flip-flop 32, which H output is connected to one input of the AND-gate 33. Accordingly, the signal at the output of AND-gate 33 is a 0 signal. Therefore, the signal at the output of the OR-gate 34 will likewise be a 0 signal. The transition from a 1 signal to a 0 signal at the output $a$ of monostable multivibrator 31 accordingly activates the set input E of counting stage 19. As a result, the counting stages 17 and 18 will be set to a count corresponding to the desired grinding allowance. As explained above, the term "grinding allowance" employed herein refers to the desired depth of cut plus a small additional safety margin. The counting stage 19 will be set to a count somewhat greater than the reduction in grinding wheel radius to be compensated for after truing or dressing of the grinding wheel.

The oscillator 35 serves to generate motor-energizing pulses. However, the output pulses of the oscillator 35 to reach the motor 8 must pass through the AND-gate 36. In order to reliably prevent activation of the spindle drive before all the counting stages have been set, the signal at the output $a$ of the monostable multivibrator 31 is directly applied to one of the inputs of AND-gate 36.

The output $b$ of the monostable multivibrator 31 is connected via a Schmitt trigger stage 37, which acts as a pulse delay stage, to the set input S of the flip-flop 38. Accordingly, shortly after the counting stages have been set, the flip-flop 38 undergoes a transition to its second stable state. The signal at the output H of the flip-flop 38 is applied directly to one of the inputs of the AND-gate 36. When now the monostable multivibrator 31 reverts to its stable state, logical 1 signals will be applied to all the inputs of the AND-gate 36. As a result, the control pulses from the oscillator 35 are transmitted by the thyristor current rectifier 11. The fine-adjustment movement of the grinder carriage 2 begins.

The pulse generator 10 generates pulses proportional in number to the number of rotations of the spindle 6. These pulses are applied to the clock input F of the counting stage 19, and cause the counting stage to count down digitally to zero. However, before the count registered by the counter actually reaches zero, the measuring arrangement 16 generates a signal indicating that the finished size of the workpiece 3 has been reached, this signal being generated by movement of the schematically depicted switching arrangement 16$a$ in a sense transmitting a "1" signal via the OR-gate 39 to the set input S of the flip-flop 32. The signal on the output H of flip-flop 32 changes from 0 to 1, thereby simultaneously activating the direction-reversing circuit 12 and triggering the monostable multivibrator 40. Since the signal at the output $a$ of monostable multivibrator 40 is a 0 signal for the duration of the unstable state of the multivibrator 40, such 0 singal will be applied to the respective input of AND-gate 36, thereby blocking the passage of motor-energizing pulses from the oscillator 35. Accordingly no further fine-adjustment movement of the grinder carriage 2 occurs.

During the time period for which the motor-energizing pulses from oscillator 35 are thusly blocked, the duration of which is determined by the time constant of the monostable multivibrator 40, the counter is set anew, because the monostable multivibrator 27 will be triggered to the unstable state thereof in consequence of the 0 to 1 transition at the output $b$ of the monostable multivibrator 40. As a result, the signals at the output of AND-gate 28 and accordingly at the output of AND-gate 30 will be 0 signals. As soon as the monostable multivibrator 27 reverts to its stable state, the signal at the input of monostable multivibrator 31 will again undergo a transition from 0 to 1. As a result, the 0 signal will again appear on the output $a$ of the monostable multivibrator 31. This 0 signal effects setting of the counting stages 17 and 18 to the preselected numbers applied to the information inputs A, B, C, D thereof. However, the counting stage 19 remains at count zero, so that the grinder carriage 2, as a result of the subsequent retraction thereof under the action of the screw-spindle drive, will be retracted only to the extent of the so-called "grinding allowance" distance defined above, which is what should occur. As the circuit criterion for this, there serve on the one hand the 1 signal furnished by limit switch 29 and on the other hand the 1 signal appearing at the output H of the flip-flop 38. These 1 signals are applied to the respective two inputs of the AND-gate 41, and a 1 signal accordingly appears at the output of AND-gate 41, this output being connected to one input of the AND-gate 33. However, at this time, a 1 signal is also present at the output H of the flip-flop 32, such 1 signal being applied to the second input of the AND-gate 33, in consequence of which a 1 signal appears at the output of AND-gate 33. This 1 signal is applied to the right-hand input of OR-gate 34, and accordingly prevents setting of the counter 19 to the encoded number applied to the information inputs A, B, C, D, irrespective of whether the signal at the other input of OR-gate 34 is 0 or 1.

The time constant of the monostable multivibrator 40 is greater than the combined time constants of the monostable multivibrators 27 and 31. When the monostable multivibrator 40 reverts to its stable state, a 1 signal is again applied to the corresponding input of AND-gate 36. As a result, the motor-energizing pulses from oscillator 35 are again passed through AND-gate 36 and through thyristor current rectifier 11, and accordingly the spark out period is terminated. In consequence of the activation of the direction-reversing circuit 12, the motor 8 now turns in the opposite direction, and the grinder carriage 2 is drawn backwards under the control of the spindle 6 and the spindle nut 7. The 0 to 1 transition at the output $a$ of the monostable multivibrator 40 is furthermore applied to the reset input R of the flip-flop 25, and accordingly the signal at the output H of flip-flop 25 changes from 1 back to 0. The control magnet 15 is de-energized, and the valve 14 switches the hydraulic quick-traverse to "Forwards." During this time, the counter again counts the pulses coming from the pulse generator 10, and when the counter has reached the count zero, the last clock pulse is applied to the reset inputs of the flip-flops 32 and 38. There is now at the output H of flip-flop 38 no 1 signal, and accordingly, the AND-gate 36 will no longer pass pulses from oscillator 35, so that the fine-adjustment retraction of the grinder carriage 2 by means of the screw spindle drive, ends. As a further result of the absence of a 1 signal at the output H of flip-flop 32, the direction reversing circuit 12 reverts to its normal state. This constitutes the end of a complete operating cycle, with all circuit components being in their starting state described above.

In the event the measuring arrangement 16 malfunctions, halting of the slow infeed advancement of the carriage 2 is assured, so that damage to the machine tool is prevented, as will become clear from the following description of what occurs.

The first half of the operating cycle proceeds exactly as described above, except that now upon reaching the desired demension of the workpiece, no stop signal is furnished by the measuring arrangement 16, due to malfunction of the arrangement 16. Instead, the screw-spindle advancement of carriage 2 proceeds, until the count zero has been reached. The last clock pulse is applied to the reset input R of the flip-flop 38, and the signal at the output H thereof changes from 1 to 0. This 0 sgnal is applied to the corresponding input of the AND-gate 36, in consequence of which the motor-energizing pulses from oscillator 35 no longer pass the AND-gate 36, and the screw-spindle advancement of the carriage 2 ends.

The absence of a 1 signal on the output H of flip-flop 38 simultaneous with the existence of a 1 signal furnished by the limit switch 19, constitutes the criterion by which the existence of a malfunction is determined. Solely in this circumstances does the exclusive OR-gate 42 receive on one input thereof a 1 signal (from limit switch 29) and on the other input thereof an 0 signal (from the flip-flop 38). Accordingly, a 1 signal appears at the output of the exclusive OR-gate 42. This 1 signal is applied via an amplifying stage 43 to an alarm arrangement 43, for example a warning light. The 1 signal is furthermore applied via the OR-gate 39 to the set input S of the flip-flop 32. As described above, setting of the flip-flop 32 on the one hand activates the direction reversing circuit 12, and on the other hand effects a renewed setting of the counter. In this situation, however, there is no 1 signal at the output of AND-gate 41, and accordingly there is likewise no 1 signal at the output of AND-gate 33. Consequently, when the signal at the output $a$ of the monostable multivibrator 31 changes from 1 to 0 there will be a 0 signal at the set input E of the counting stage 19, as a result of which this counting stage will become set for the number selected by means of the associated keyboard 22. Because the grinding disk 2 penetrates deeper into the workpiece to the extent of the number set on keyboard 22 to compensate for the radius reduction of the grinding wheel, the rearwards movement of the piston 7 must now likewise be increased by the distance represented by the number set on keyboard 22.

The pulse appearing at the output $b$ of the monostable multivibrator 31 is applied in delayed form by the Schmitt trigger 37 to the set input S of the flipflop 38, so that the counting stage 19 will be reliably set if in consequence of the 1 signal at the output H of the flip-flop 38 the AND-condition of the AND-gates 41 and 33 is again satisfied and accordingly a delayed 1 signal is applied to the set input E of the counting stage 19.

As soon as the monostable multivibrator revers to its stable state (end of the spark out period), the carriage 2 is retracted, both under the action of the quick-traverse hydraulic means the slow-traverse screw spindle arrangement. Upon reaching the count zero, the flip-flops 32 and 38 and also the direction reversing circuit 12 revert to their original or starting conditions, and accordingly the motor-energizing pulses generated by the oscillator 35 are blocked by the AND-gate 36. The starting position and conditions of all circuit elements and of the grinding wheel 2 are reached, constituting the end of a complete operating cycle.

It will be understood that the workpiece just referred to will become a reject; however, this is preferable to possible damaging of the machine or the danger of accidents resulting from destruction of the grinding disk, which are reliably avoided.

In the event the measuring arrangement 16 cannot be repaired quickly enough, or in the event that an interruption of production is not desired, the inventive arrangement can advantageously be further operated in such a manner that the control of the slow-traverse carriage advancement and retraction is determined only by the preselected number set on the keyboards. Advantageously in this connection, only immediately after dressing of the grinding wheel is a number corresponding to the grinding wheel radius decrease entered in the keyboard 22 and immediately after the start of the slow-traverse movement the value zero is entered on the keyboard 22.

The measuring accuracy achievable without the measuring arrangement is determined only by the increment of slow-traverse movement corresponding to one clock pulse. Irregularities of the slow-traverse velocity (for example as a result of unequal frictional engagement between the grinder carriage 2 and the carriage guide track 4) have no appreciable effect upon the accuracy with which the distance travelled by the carriage can be controlled.

The invention is not limited to the exemplary embodiment depicted in the drawing. For example, instead of employing electronic counting and circuit elements, it would also be possible within the scope of the invention to employ fluid logic elements. For the drive motor of the screw spindle 6 any suitable type of motor can be used, for example a stepper motor. Furthermore, the inventive arrangement can be employed for the control of the movement of the carriage of all types of machine tools, for example with automatic screw machines and the like. Additionally, the use of a quick-traverse drive is not absolutely necessary.

It will be understood that each of the elements described above, or two or more together, amy also find a useful application in other types of circuits and constructions differing from the types described above.

While the invention has been illustrated and described as embodied in an arrangement for controlling the movement of a grinding wheel carriage in a grinding machine, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. In a machine tool in combination, a work tool carriage mounted for movement along a predetermined path towards and away from a workpiece; moving means for moving said carriage along said path and including rotatable means operative for causing said moving means to move said carriage along said path a distance proportional to the number of rotations performed by said rotatable means; selecting means for selecting a distance to be travelled by said carriage along said path; pulse-generating means operative for detecting rotation of said rotatable means and generating a pulse each time said rotatable means rotates through a predetermined angle; and control means receiving pulses generated by said pulse-generating means and operative for initiating operation of said rotatable means and for thereafter automatically terminating operation of said rotatable means in response to receipt of a sequence of pulses corresponding to the selected distance.

2. In a machine tool as defined in claim 1, wherein said moving means includes drive means for rotating said rotatable means, and wherein said control means comprises means for initiating a forwards operation of said drive means to cause said rotatable means to rotate in a direction causing said moving means to move said carriage along said path towards a workpiece, counting means for counting the number of pulses generated by said pulse-generating means, and means for terminating operation of said drive means when the number of pulses counted by said counting means equals a predetermined number corresponding to said distance.

3. In a machine tool as defined in claim 2, wherein said pulse-generating means comprises means mechanically coupled to said rotatable means.

4. In a machine tool as defined in claim 2, wherein said selecting means for selecting a distance to be travelled by said carriage along said path comprises means for selecting a corresponding predetermined number of rotations to be performed by said rotatable means.

5. In a machine tool as defined in claim 1, wherein said rotatable means comprises a rotatable threaded spindle and means coupling said rotatable threaded spindle to said work tool carriage for controlling the extent to which said moving means moves said carriage along said path in dependence upon the number of rotations performed by said rotatable threaded spindle.

6. In a machine tool as defined in claim 2, wherein said counting means comprises a backwards-counting counter operative for counting backwards from a preselected number down to zero, said backwards-counting counter having a clock input connected to said pulse-generating means for receipt of pulses to be counted and having an output at which appears a signal when the backwards-counting counter has counted down to zero, and wherein said selecting means comprises means for selecting said preselected number, and wherein said means for terminating operation of said drive means when the number of pulses counted by said counter equals a number corresponding to said distance comprises means connected to said output of said backwards-counting counter for terminating operation of said drive means in response to appearance of said signal at said output of said backwards-counting counter.

7. In a machine tool as defined in claim 6, wherein said control means further includes means automatically operative after said backwards-counting counter has counted down to zero for resetting said backwards-counting counter to said preselected number, means for thereafter initiating reverse operation of said drive means to cause said rotatable means to rotate in an opposite direction causing said moving means to move said carriage along said path away from the workpiece, said means for terminating operation of said drive means comprising means for terminating said reverse operation of said drive means in response to appearance of said signal at said output of said backwards-counting counter.

8. In a machine tool as defined in claim 6, wherein said control means further includes means for measuring a dimension of a workpiece being worked by the work tool on said work tool carriage and operative for terminating said forwards operation of said drive means in advance of said counter reaching count zero if the dimension of the workpiece reaches a preselected value, means automatically operative after such termination of operation of said drive means for resetting said backwards-counting counter to a different preselected number, means for thereafter initiating a reverse operation of said drive means to cause said rotatable means to rotate in an opposite direction causing said moving means to move said carriage along said path away from the workpiece, said means for terminating operation of said drive means in response to appearance of said signal at said output of said backwards-counting counter comprising means for terminating said reverse operation of said drive means in response to appearance of said signal at said output of said backwards-counting counter.

9. In a machine tool as defined in claim 7, wherein said control means further includes means for introducing a delay between the termination of said forwards operation of said drive means and the initiation of said reverse operation of said drive means, whereby to permit a work tool mounted on said work tool carriage to remain in contact with a workpiece for the time of such delay to assure finishing of the working of the workpiece by the work tool.

10. In a machine tool as defined in claim 2, wherein said counting means comprises a forwards-counting counter operative for counting forwards from zero to a preselected number, said forwards-counting counter having a clock input connected to said pulse-generating means for receipt of pulses to be counted and having an output at which appears a signal when the forwards-counting counter has counted up to said preselected number, and wherein said selecting means comprises means for selecting said preselected number, and wherein said means for terminating operation of said drive means when the number of pulses counted by said counter equals a number corresponding to said distance comprises means connected to said output of said forwards-counting counter for terminating said forwards operation of said drive means in response to appearance of said signal at said output of said forwards-counting counter.

11. In a machine tool as defined in claim 10, wherein said control means further includes means automatically operative after said forwards-counting counter has counted from zero to said preselected number for resetting said forwards-counting counter back to zero, means for thereafter initiating reverse operation of said drive means to cause said rotatable means to rotate in an opposite direction causing said moving means to move said carriage along said path away from the workpiece, said means for terminating operation of said drive means comprising means for terminating said reverse operation of said drive means in response to appearance of said signal at said output of said forwards-counting counter.

12. In a machine tool as defined in claim 10, wherein said control means further includes means for measuring a dimension of a workpiece being worked by a work tool on said work tool carriage and operative for terminating said forwards operation of said drive means in advance of said counter reaching said preselected number if the dimension of the workpiece reaches a preselected value, means automatically operative after such termination of operation of said drive means for resetting said forwards-counting counter back to zero, means for thereafter initiating a reverse operation of said drive means to cause said rotatable means to rotate in an opposite direction causing said moving means to move said carriage along said path away from the workpiece, said means for terminating operation of said drive means comprising means for terminating said reverse operation of said drive means when said forwards-counting counter has counted up to a different second preselected number.

13. In a machine tool as defined in claim 11, wherein said control means further includes means for introducing a delay between the termination of said forwards operation of said drive means and the initiation of said reverse operation of said drive means, whereby to permit a work tool mounted on said work tool carriage to remain in contact with a workpiece for the time of such delay to assure finishing of the working of the workpiece by the work tool.

14. In a machine tool as defined in claim 2, wherein said pulse-generating means comprises means for generating a train of pulses having a frequency proportional to the rotational frequency of said rotatable means.

15. In a machine tool as defined in claim 1, and further including hydraulic means for effecting quick-traverse advancement and retraction of said work tool carriage.

* * * * *